United States Patent
Park et al.

(10) Patent No.: US 11,400,395 B2
(45) Date of Patent: *Aug. 2, 2022

(54) WATER PURIFYING FILTER

(71) Applicant: Samsung Electronics Co., Ltd., Suwon-si (KR)

(72) Inventors: Sang Min Park, Suwon-si (KR); Jae Koog An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,597

(22) Filed: Dec. 27, 2019

(65) Prior Publication Data

US 2020/0139280 A1 May 7, 2020

Related U.S. Application Data

(63) Continuation of application No. 15/648,585, filed on Jul. 13, 2017, now Pat. No. 10,632,405.

(30) Foreign Application Priority Data

Jul. 13, 2016 (KR) .................. 10-2016-0088669
Jun. 2, 2017 (KR) .................. 10-2017-0069225

(51) Int. Cl.
*B01D 35/31* (2006.01)
*C02F 1/00* (2006.01)
(Continued)

(52) U.S. Cl.
CPC .............. *B01D 35/31* (2013.01); *C02F 1/001* (2013.01); *C02F 1/003* (2013.01); *B01D 35/30* (2013.01);
(Continued)

(58) Field of Classification Search
CPC ...... B01D 35/30; B01D 35/305; B01D 35/31; B01D 2201/307; B01D 2201/302;
(Continued)

(56) References Cited

U.S. PATENT DOCUMENTS 1,896,310 A 2/1933 Hildebrand
4,452,697 A 6/1984 Conrad
(Continued)

FOREIGN PATENT DOCUMENTS

CN 1120520 4/1996
CN 1896661 1/2007
(Continued)

OTHER PUBLICATIONS

Chinese Office Action dated Jul. 3, 2020 in Chinese Patent Application No. 201780043701.5.
(Continued)

*Primary Examiner* — Benjamin M Kurtz
(74) *Attorney, Agent, or Firm* — Staas & Halsey LLP

(57) ABSTRACT

A water purifying filter has a cylindrical inner housing to receive a filter therein, and an outer housing to receive the inner housing. The inner housing and the outer housing are spaced apart from each other to form an insulation space configured to suppress heat transfer and to reduce the filter freezing inside the inner housing.

11 Claims, 17 Drawing Sheets

(51) Int. Cl.
*B01D 35/30* (2006.01)
*F25D 23/12* (2006.01)

(52) U.S. Cl.
CPC .... *B01D 2201/16* (2013.01); *B01D 2201/302* (2013.01); *B01D 2201/307* (2013.01); *B01D 2201/31* (2013.01); *C02F 2201/002* (2013.01); *C02F 2201/004* (2013.01); *C02F 2201/005* (2013.01); *C02F 2201/006* (2013.01); *C02F 2307/10* (2013.01); *C02F 2307/12* (2013.01); *F25D 23/126* (2013.01); *F25D 2323/121* (2013.01)

(58) Field of Classification Search
CPC ............... B01D 2201/31; C02F 1/003; C02F 2201/004; C02F 2201/006; C02F 2201/002; C02F 2307/10; C02F 2307/12; F25D 2323/121
See application file for complete search history.

(56) References Cited

U.S. PATENT DOCUMENTS

| | | | |
|---|---|---|---|
| 5,128,034 | A | 7/1992 | Kool |
| 5,465,865 | A | 11/1995 | Coombes |
| 5,601,710 | A | 2/1997 | Yoon et al. |
| 10,632,405 | B2 * | 4/2020 | Park ............... B01D 35/31 |
| 2007/0278148 | A1 | 12/2007 | Fritze |
| 2011/0284096 | A1 | 11/2011 | Coleman |
| 2012/0285192 | A1 | 11/2012 | Mitchell et al. |
| 2015/0290674 | A1 | 10/2015 | Chernov et al. |
| 2016/0187051 | A1 | 6/2016 | Lim et al. |

FOREIGN PATENT DOCUMENTS

| | | |
|---|---|---|
| CN | 104545438 | 4/2015 |
| GB | 2522219 | 7/2015 |
| KR | 10-2016-0052501 | 5/2016 |
| KR | 10-2016-0052501 A | 5/2016 |

OTHER PUBLICATIONS

U.S. Office Action dated Oct. 23, 2017 in U.S. Appl. No. 15/692,240.
International Search Report dated Sep. 20, 2017 in International Patent Application No. PCT/KR2017/006693.
U.S. Office Action dated Feb. 28, 2018 in U.S. Appl. No. 15/692,240.
U.S. Office Action dated Jun. 6, 2018 in U.S. Appl. No. 15/692,240.
U.S. Office Action dated Nov. 8, 2018 in U.S. Appl. No. 15/692,240.
U.S. Office Action dated Mar. 4, 2019 in U.S. Appl. No. 15/692,240.
Extended European Search Report dated Jan. 24, 2019 in European Patent Application No. 17827829.7.
U.S. Notice of Allowance dated Aug. 27, 2019 in U.S. Appl. No. 15/692,240.
U.S. Office Action dated Oct. 9, 2018 in U.S. Appl. No. 15/648,585.
U.S. Office Action dated Feb. 27, 2019 in U.S. Appl. No. 15/648,585.
U.S. Office Action dated Aug. 29, 2019 in U.S. Appl. No. 15/648,585.
U.S. Notice of Allowance dated Dec. 20, 2019 in U.S. Appl. No. 15/648,585.
U.S. Appl. No. 15/648,585, filed Jul. 13, 2017, Sang Min Park, et al., Samsung Electronics Co., Ltd.
U.S. Appl. No. 15/692,240(now U.S. Pat. No. 10,500,530), filed Aug. 31, 2017, Sang Min Park, et al., Samsung Electronics Co., Ltd.
European Communication dated May 4, 2020 in European Patent Application No. 17827829.7.
European Communication dated Dec. 11, 2020 in European Patent Application No. 17827829.7.
Indian Office Action dated Nov. 9, 2020 in Indian Patent Application No. 201817032490.
Korean Office Action dated May 10, 2021, in corresponding Korean Patent Application No. 10-2017-0069225.
Australian Office Action dated Mar. 10, 2022 in Australian Patent Application No. 2017295353.

* cited by examiner

WATER PURIFYING FILTER

CROSS-REFERENCE TO RELATED APPLICATIONS

This application is a continuation application of U.S. patent application Ser. No. 15/648,585 filed on Jul. 13, 2017, which claims the priority benefit of Korean Patent Application No. 10-2016-0088669 filed on Jul. 13, 2016, and of Korean Patent Application No. 10-2017-0069225, filed on Jun. 2, 2017, in the Korean Intellectual Property Office, the disclosures of each of which are incorporated herein by reference in their entirety.

BACKGROUND

1. Field

Embodiments of the disclosure relate to a water purifying filter for filtering foreign materials included in water.

2. Description of the Related Art

Recently, among refrigerators, there are refrigerators including a dispenser configured to supply water or an ice maker configured to automatically make ice.

Among refrigerators, there are refrigerators including a dispenser configured to supply water or an ice maker configured to automatically make ice, and such refrigerators include a water supply apparatus configured to receive water from an external water supply source and supply the water to the dispenser or the ice maker.

The refrigerator including the water supply apparatus includes a water purifying filter for filtering foreign materials included in water and supplies the water to the dispenser or the ice maker after filtering the foreign materials included in the water supplied from an external water supply source.

The water purifying filter includes a filter therein, such as a carbon block, capable of adsorbing foreign materials, and the materials filtered from the water are gradually accumulated in the filter while the filter is used. Accordingly, performance of the water purifying filter is gradually declined, and thus the water purifying filter has to be replaced after a predetermined period has elapsed.

Accordingly, the water purifying filter is detachably installed in the refrigerator and is separated from the refrigerator after being used for a predetermined period, and a new water purifying filter is installed and used in the refrigerator.

SUMMARY

Therefore, it is an aspect of the disclosure to provide a water purifying filter capable of reducing freezing that may occur when being used in a refrigerator.

In addition, it is another aspect of the disclosure to provide a water purifying filter capable of reducing damage due to an external impact and water leaking caused thereby.

In addition, it is still another aspect of the disclosure to provide a refrigerator in which a water purifying filter may be more stably connected to a connection valve.

Additional aspects of the disclosure will be set forth in part in the description which follows and, in part, will be apparent from the description, or may be learned by practice of the disclosure.

In accordance with an aspect of the disclosure, a water purifying filter may include a filter, an inner housing formed in a circular tube shape, configured to accommodate the filter, and configured to guide water to the filter, and an outer housing configured to accommodate the inner housing, wherein, while the inner housing is accommodated in the outer housing, the inner housing and the outer housing are spaced apart from each other to form an insulation space configured to suppress heat transfer therebetween.

The inner housing and the outer housing may include ends spaced apart from each other by a first gap and ends spaced apart from each other by a second gap which is greater than the first gap, and the insulation space is filled with air to form an air layer.

The outer housing may be formed in a rectangular tube shape, and one side of the outer housing is open to accommodate the inner housing.

One side of the inner housing may be open and one side of the outer housing, corresponding to the one side of the inner housing, may be open. The water purifying filter may further include a connecting cap configured to cover the open sides of the inner housing and the outer housing.

The connecting cap may include a cap configured to cover the open one sides of the inner housing and the outer housing, an inner fixer configured to extend from the cap toward the inner housing in a circular tube shape, wherein the open one side of the inner housing is fixed by the inner fixer, and an outer fixer configured to extend from the cap toward the outer housing in a rectangular tube shape, wherein the open one side of the outer housing may be fixed by the outer fixer.

The open inner housing and the inner fixer may be spin-welded.

The water purifying filter may further include a support rib configured to provide support between the outer housing and the inner housing spaced apart from each other.

One side of the inner housing may be open and one side of the outer housing, corresponding to the one side of the inner housing may be open. The support rib protrudes from one of an inner surface of the other side of the outer housing opposite the one side of the outer housing and an outer surface of the other side of the inner housing opposite the one side of the inner housing and is supported by the other one.

The support rib may protrude from one of an outer circumferential surface of the inner housing and an inner surface of the outer housing and may be supported by the other one.

The outer housing may further include a stopper formed in a shape corresponding to an installation hole, wherein the water purifying filter may be installed at the other side of the installation hole.

The outer housing may further include a body configured to accommodate the inner housing and a rotary guide provided between the stopper and the body in a cylindrical shape and configured to guide rotation of the water purifying filter, and the water purifying filter may be rotated and coupled to a connection valve included in the installation hole when the rotary guide is positioned in the installation hole.

Corners formed between surfaces of the outer housing may be formed as rounding portions having curved surfaces, and the water purifying filter may rotate while the rounding portions are supported by a guide member in the installation hole.

In accordance with an aspect of the disclosure, a water purifying filter may include a filter, an inner housing formed in a circular tube shape, configured to accommodate the filter, and configured to guide water to the filter, and an outer housing formed in a rectangular tube shape and configured to accommodate the inner housing, wherein, while the inner housing is accommodated in the outer housing, the inner housing and the outer housing are spaced apart from each other to form an insulation space configured to suppress heat transfer therebetween.

BRIEF DESCRIPTION OF THE DRAWINGS

These and/or other aspects of the disclosure will become apparent and more readily appreciated from the following description of the exemplary embodiments, taken in conjunction with the accompanying drawings, in which.

DETAILED DESCRIPTION

Figure 1:
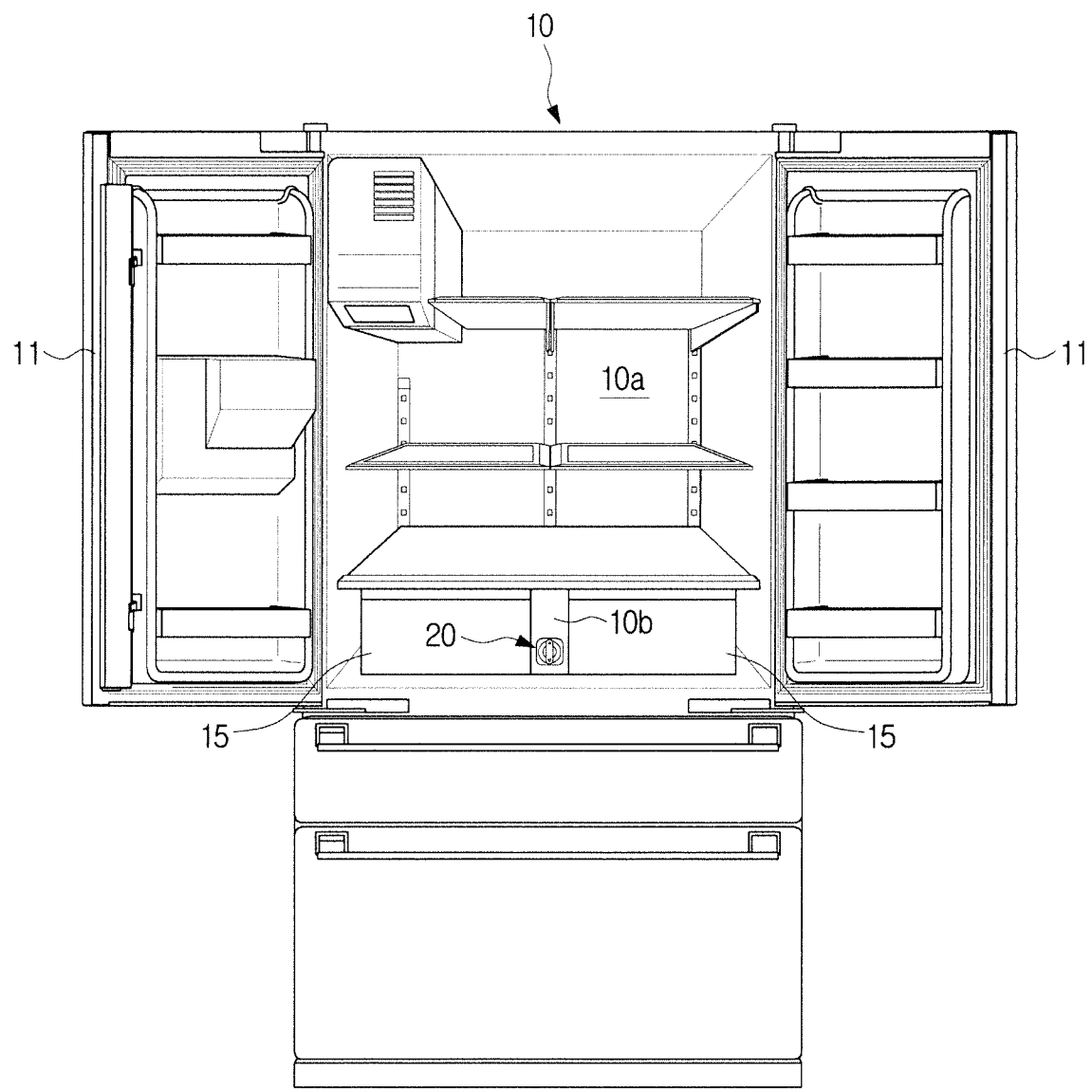
FIG. 1 is a front view illustrating a refrigerator to be applied a water purifying filter according to an embodiment of the disclosure.

Reference will now be made in detail to embodiments, the examples of which are illustrated in the accompanying drawings, wherein like reference numerals refer to like elements throughout. The embodiments are described below to explain the disclosure by referring to the figures.

Hereinafter, a refrigerator according to one or more embodiments of the disclosure will be described with reference to the accompanying drawings in detail.

Figure 2:
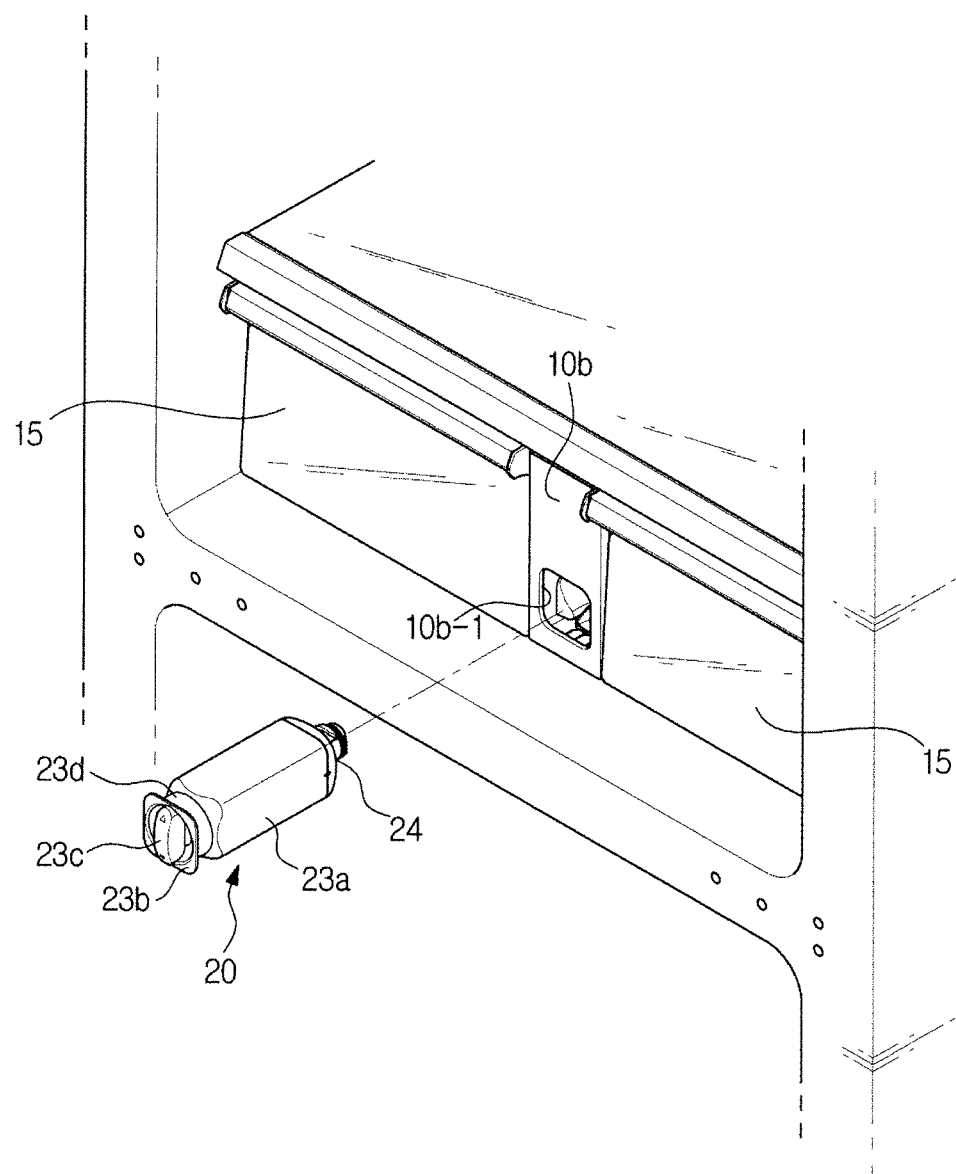
FIG. 2 is a perspective view illustrating an installation of the water purifying filter to the refrigerator according to the embodiment of the disclosure.

Referring to FIGS. 1 and 2, a refrigerator to which a water purifying filter 20 according to an embodiment of the disclosure is applied may include a main body 10 provided with a storage compartment 10a and a door 11 configured to open or close the storage compartment 10a. A dispenser (not shown) configured to supply water or ice maker (not shown) is disposed in the door 11.

The water purifying filter 20 is installed in the storage compartment 10a of the main body 10 and filters water, which will be supplied to the dispenser (not shown) or the ice maker (not shown), to remove foreign materials included in the water.

In the embodiment, the water purifying filter 20 is separably installed in a partition 10b which partitions a space in the storage compartment 10a. The partition 10b partitions the space in which drawer type storage containers 15 are installed.

Accordingly, when the performance of the water purifying filter 20 is degraded while the water purifying filter 20 is used, the water purifying filter 20 is separated from the main body 10, and a new water purifying filter 20 may be installed and used therein.

Figure 3:
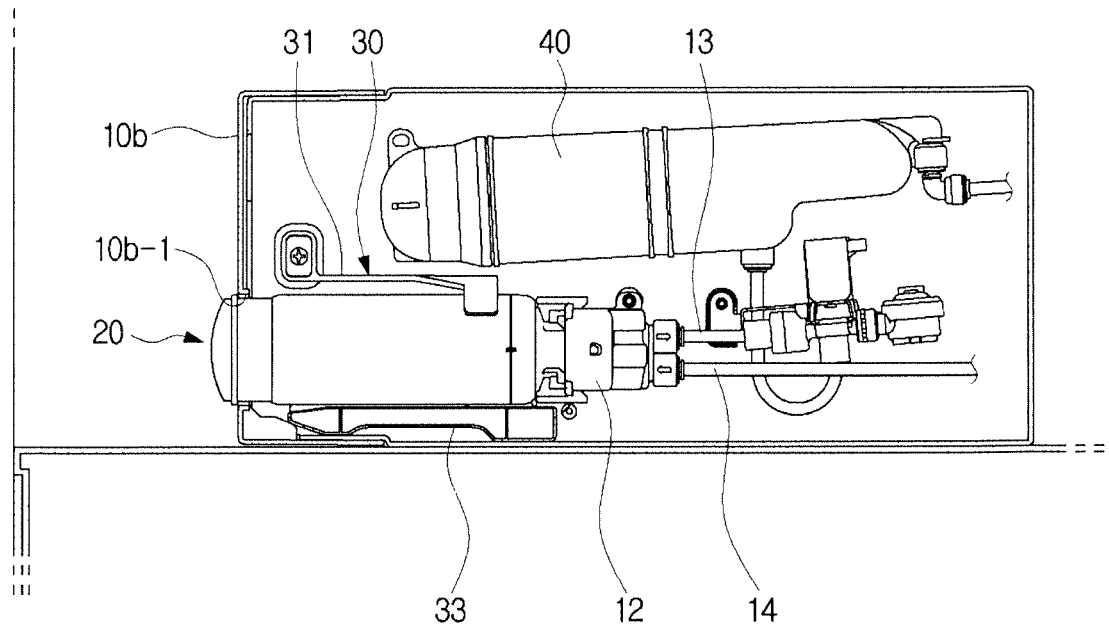
FIG. 3 is a cross-sectional view illustrating the water purifying filter and an installation guide device of the refrigerator according to the embodiment of the disclosure.

As illustrated in FIG. 3, the main body 10 may include an installation hole 10b-1 which is provided in the partition 10b and in which the water purifying filter 20 is installed and a connection valve 12 provided in the installation hole 10b-1 and connected to the water purifying filter 20 that has entered the installation hole 10b-1. In the embodiment, the water purifying filter 20 is rotated to be coupled to the connection valve 12 while inserted into the installation hole 10b-1.

Figure 4:
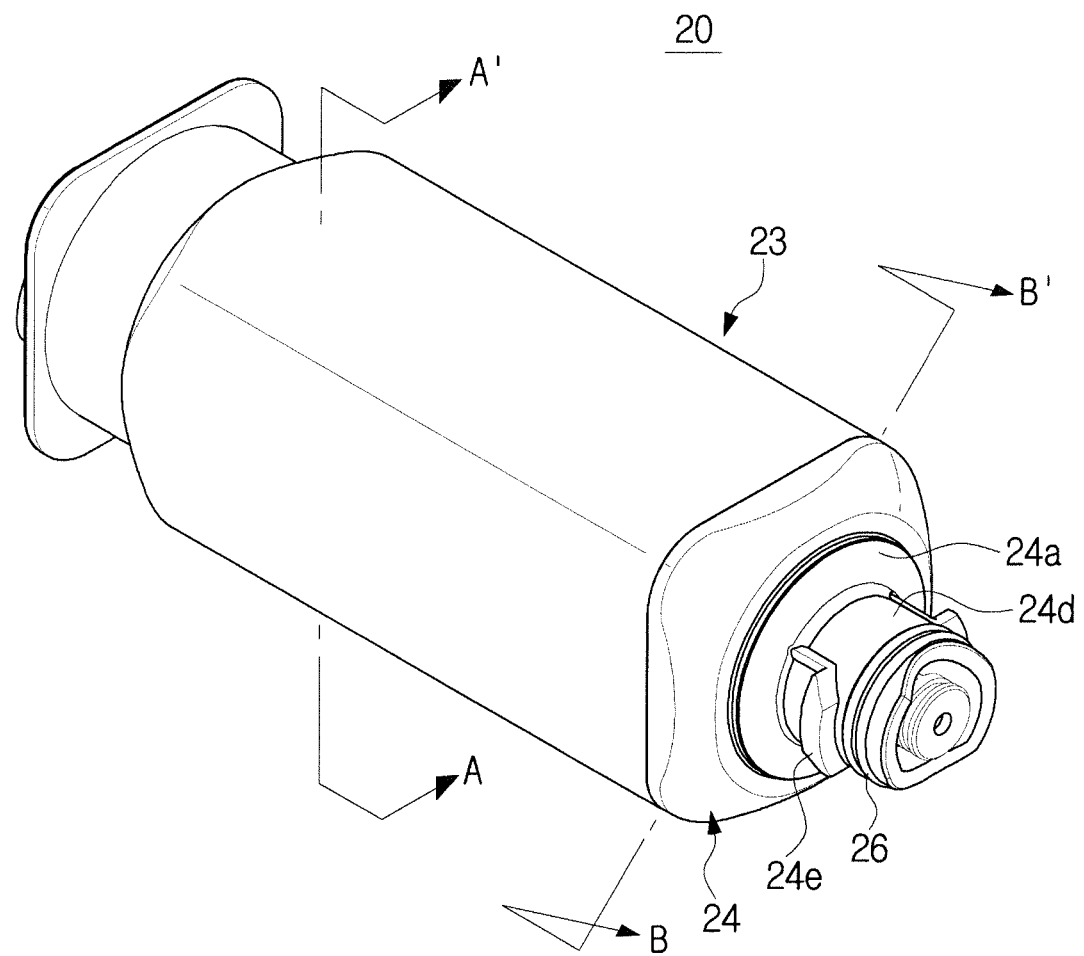
FIG. 4 is a perspective view illustrating the water purifying filter according to the embodiment of the disclosure.
Figure 5:
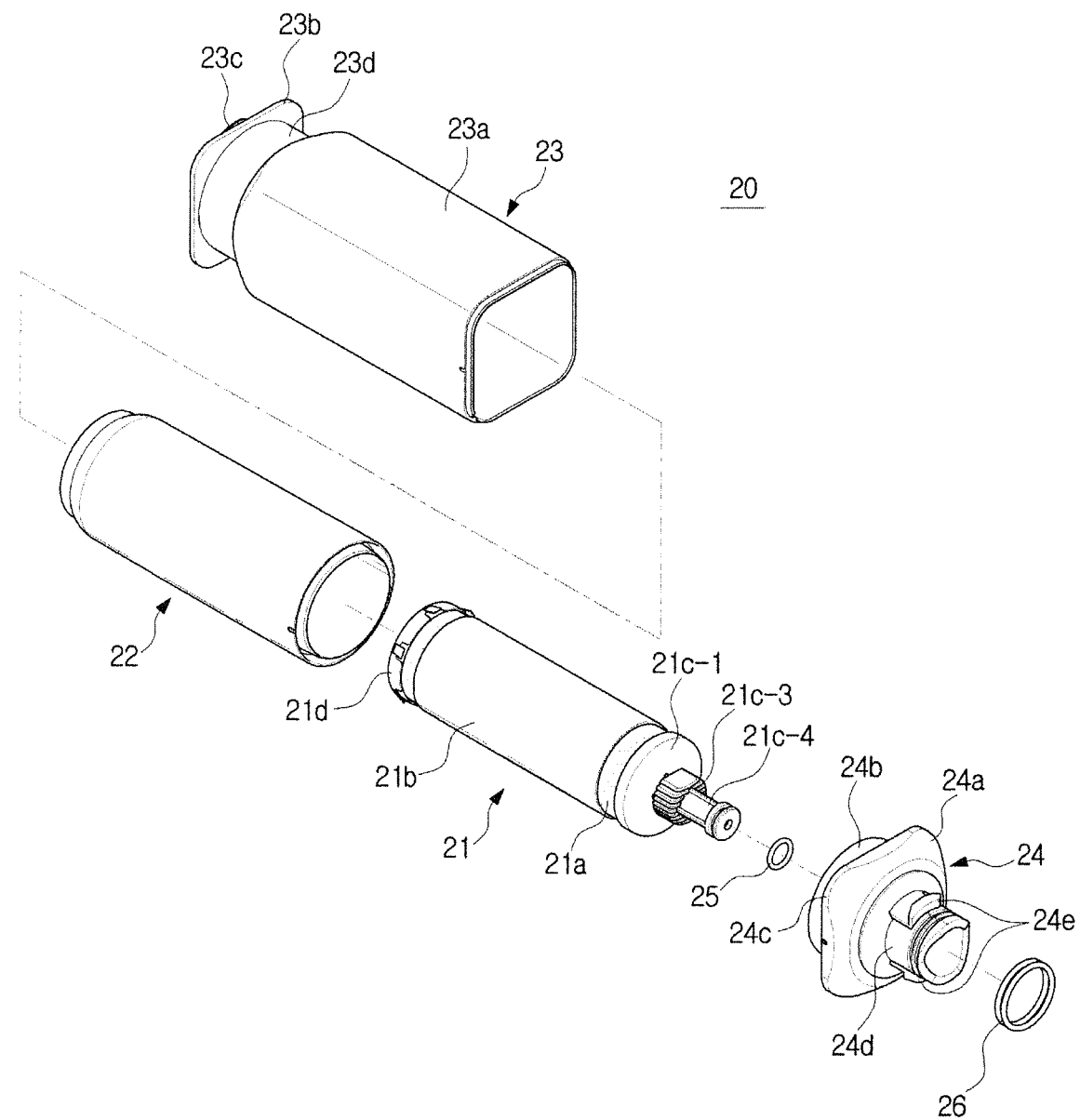
FIG. 5 is an exploded perspective view illustrating the water purifying filter according to the embodiment of the disclosure.
Figure 6:
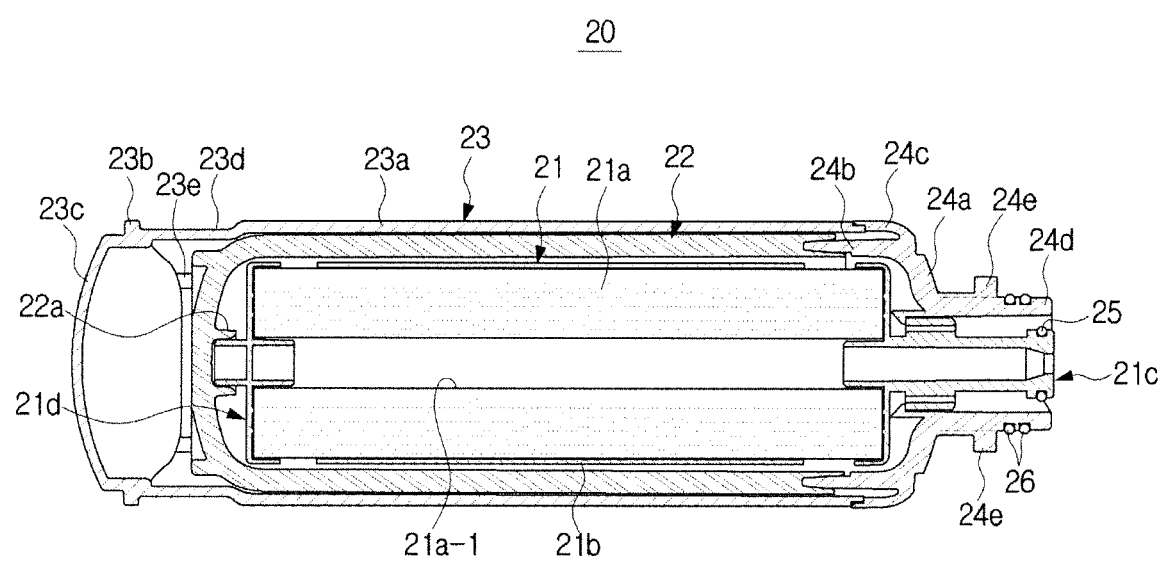
FIG. 6 is a cross-sectional view taken along the line A-A' in FIG. 4.
Figure 7:
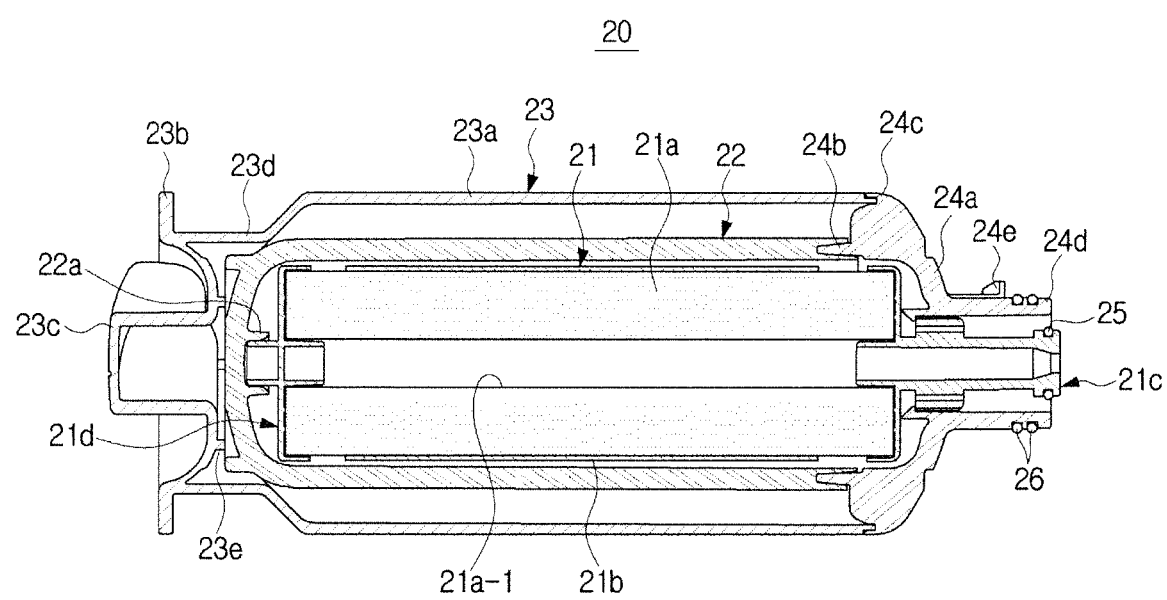
FIG. 7 is a cross-sectional view taken along the line B-B' in FIG. 4.

As illustrated in FIGS. 4 and 5, the water purifying filter 20 may include a filter 21 configured to filter foreign materials included in water, an inner housing 22 configured to accommodate the filter 21, an outer housing 23 configured to accommodate the inner housing 22, and a connecting cap 24 configured to cover one sides of the inner housing 22 and the outer housing 23 and connected to the connection valve 12 in the installation hole 10b-1 while the water purifying filter 20 is installed in the installation hole 10b-1.

The filter 21 may include an adsorber 21a configured to adsorb foreign materials included in water, a filter housing 21b configured to cover an outer circumferential surface of the adsorber 21a, a first filter cap 21c configured to cover one end of the adsorber 21a, and a second filter cap 21d configured to cover the other end of the adsorber 21a.

The adsorber 21a may be formed as a carbon block to adsorb foreign materials. The adsorber 21a may be formed in a cylindrical shape and may include a discharging guide hole 21a-1 configured to guide discharge of purified water. The discharging guide hole 21a-1 extends to pass through the adsorber 21a in an axial direction.

The filter housing 21b may be formed in a hollow tube shape and is configured to accommodate the adsorber 21a therein. Here, the filter housing 21b is shorter than the adsorber 21a, and thus both ends of the adsorber 21a are exposed to an outside of the filter housing 21b.

Figure 9:
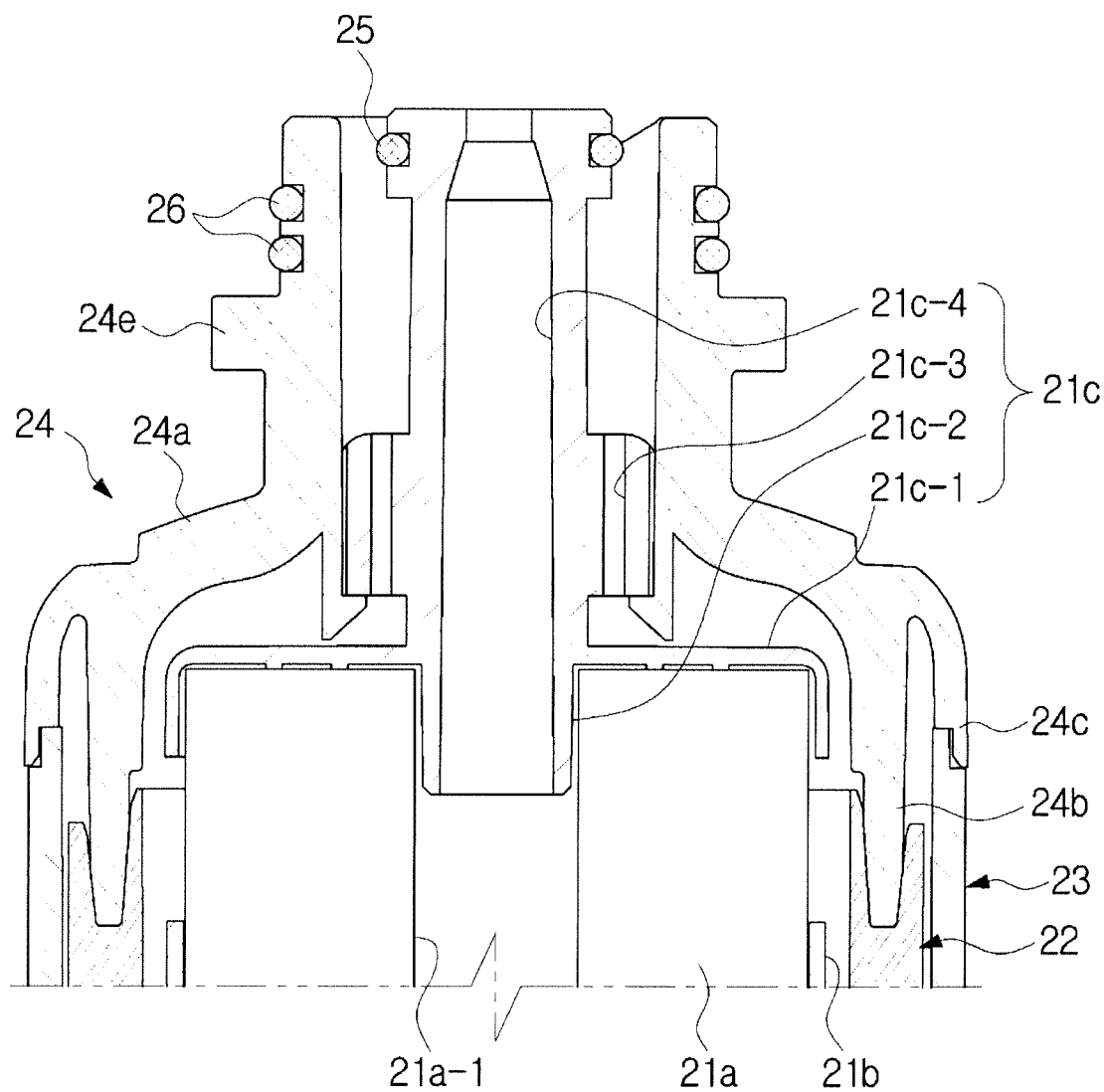
FIG. 9 is an enlarged cross-sectional view illustrating one end of the water purifying filter according to the embodiment of the disclosure.

As illustrated in FIG. 9, the first filter cap 21c may include a first cover 21c-1 configured to cover one end of the adsorber 21a, a first support 21c-2 supported by an inner surface of the discharging guide hole 21a-1, a discharging guide 21c-4 configured to guide discharge of water purified by the adsorber 21a, and an inlet guide 21c-3 configured to guide water supplied from the outside to the adsorber 21a. The first support 21c-2 and the discharging guide 21c-4 extend from a center of the first cover 21c-1 in both side directions and are formed to be connected to each other in a tube shape.

The discharging guide 21c-4 is coupled to the connection valve 12 and guides purified water to the connection valve 12, and a sealing member 25 formed as an O-ring is installed on an outer circumferential surface of the discharging guide 21c-4.

Figure 10:
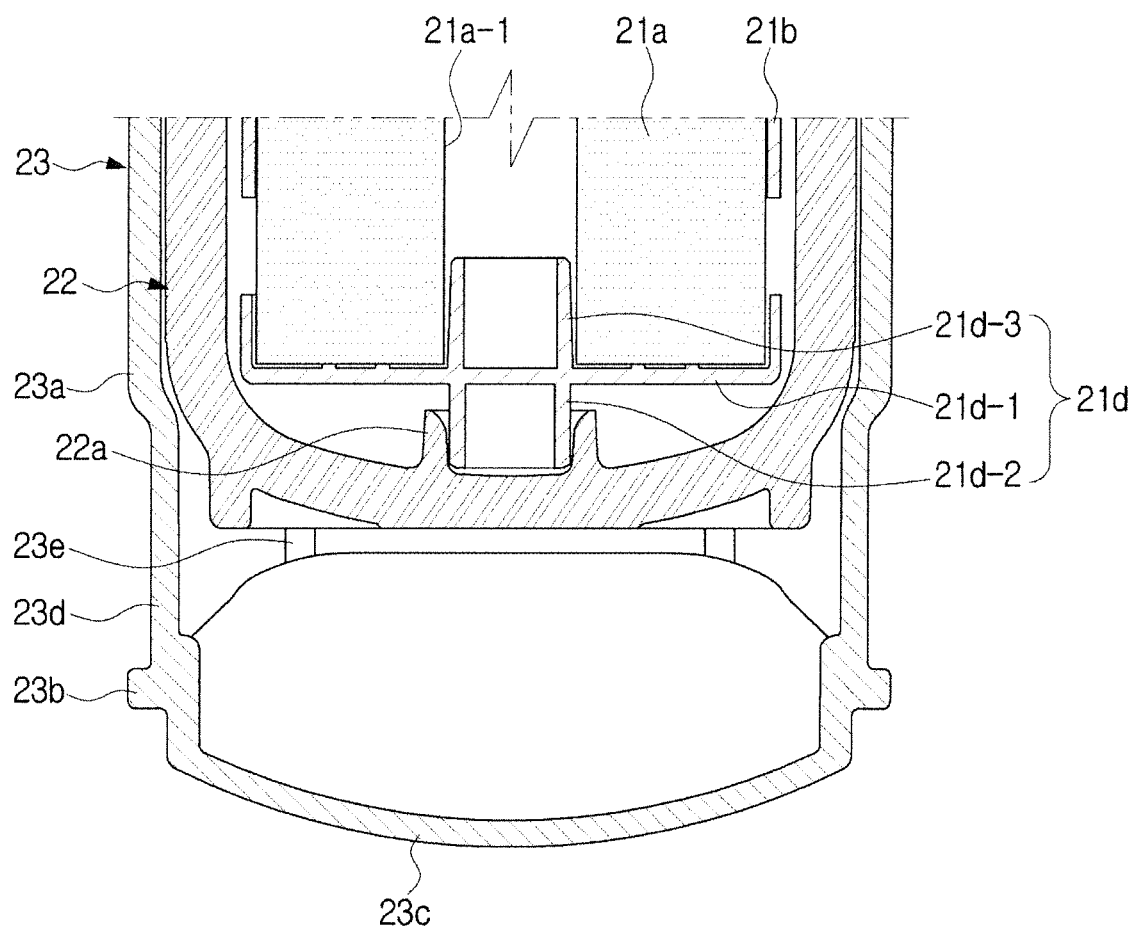
FIG. 10 is an enlarged sectional view of the other end of the water purifying filter according to the embodiment of the disclosure.
Figure 11:
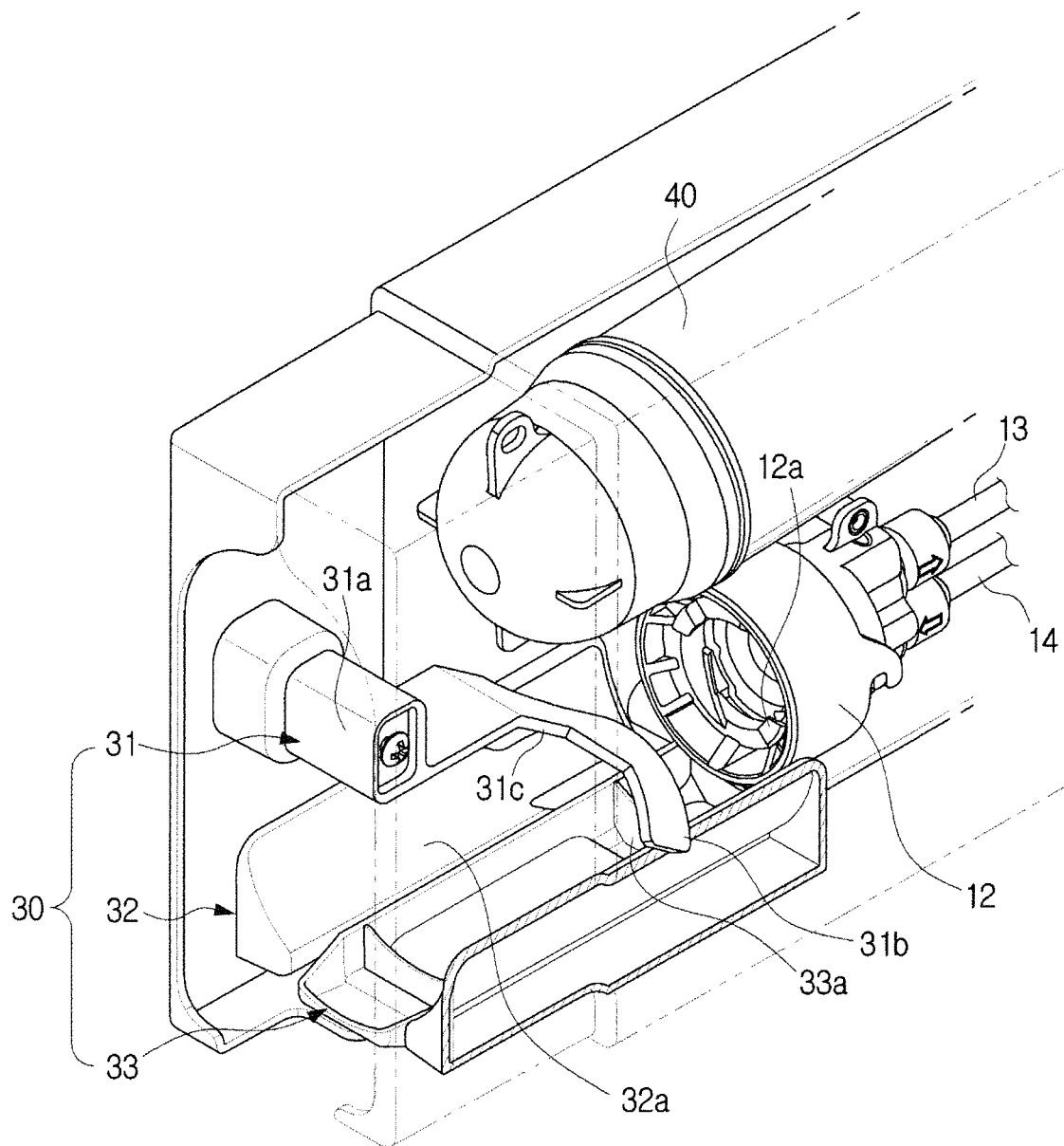
FIG. 11 is a sectional view illustrating the installation guide device provided in the refrigerator for mounting the water purifying filter according to the embodiment of the disclosure.

As illustrated in FIG. 10, the second filter cap 21d may include a second cover 21d-1 configured to cover the other end of the adsorber 21a, a second support 21d-3 supported by the inner surface of the discharging guide hole 21a-1, and a third support 21d-2 supported by the inner housing 22. The second support 21d-3 and the third support 21d-2 extend from a center of the second cover 21d-1 in both side directions. The second support 21d-3 and the third support 21d-2 are each formed in a hollow tube shape.

As illustrated in FIGS. 5 to 10, one end of the filter housing 21b is spaced apart from the first cover 21c-1, and the other end of the filter housing 21b is spaced apart from the second cover 21d-1. Accordingly, two portions of the adsorber 21a are exposed to the outside through a space between one end of the filter housing 21b and the first cover 21c-1 and a space between the other end of the filter housing 21b and the second cover 21d-1.

The inner housing 22 is formed in a circular tube shape having a predetermined length, one side thereof is open so that water can flow, the other side is closed so that water does not leak, and thus the inner housing 22 guides the water to the filter 21. Accordingly, the inner housing 22 is formed in a substantially hollow cylindrical shape and configured to accommodate the filter 21 therein. Since the inner housing 22 is formed in a circular tube shape, the inner housing 22 has a circular inner circumferential surface. Accordingly, even when water pressure is transmitted by water introduced into an inside of the inner housing 22, the water pressure is not focused on a specific portion of the inner housing 22, but is uniformly dispersed and acts on the entire inner circumferential surface of the inner housing 22. Accordingly, the inner housing 22 formed in a circular tube shape has excellent pressure resistance.

The inner housing 22 may include a seating rib 22a which protrudes from an inner surface of the other end of the closed inner housing 22 in a circular tube shape and in which the third support 21d-2 is seated.

The outer housing 23 forms an exterior of the water purifying filter 20. The outer housing is formed in a rectangular tube shape having a predetermined length, one side thereof corresponding to the open inner housing 22 is open so that the outer housing 23 may accommodate the inner housing 22, and the other side is closed for forming a sealed insulation space. Accordingly, the outer housing 23 is formed in a substantially rectangular tube shape in which one side is open, and the inner housing 22 is installed through the open one side of the outer housing 23.

Here, the inner housing 22 and the outer housing 23 are spaced apart from each other for forming the insulation space. In the embodiment, the insulation space is filled with air to form an air layer, and the air layer configured to fill the insulation space between the inner housing 22 and the outer housing 23 serves to suppress movement of heat.

Figure 8:
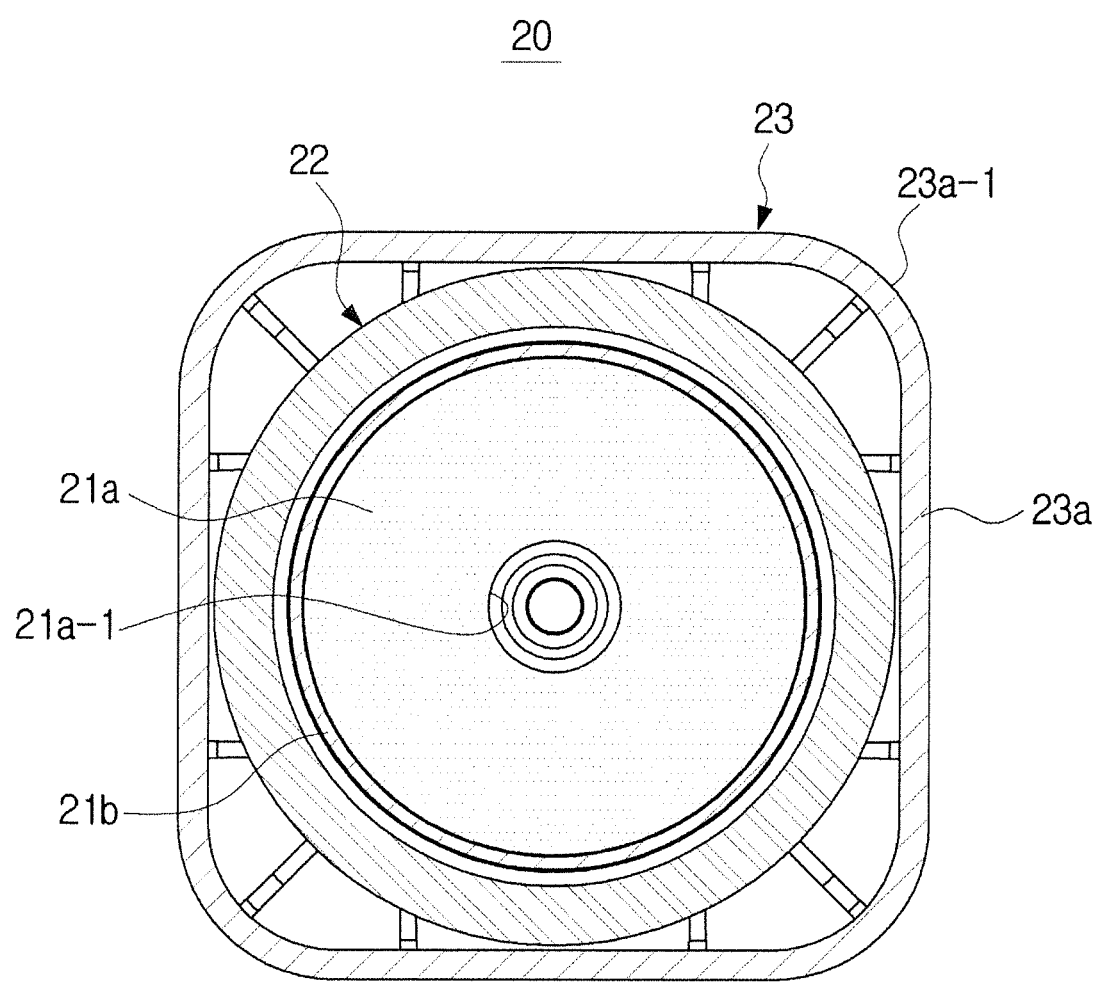
FIG. 8 is a cross-sectional view illustrating the water purifying filter according to the embodiment of the disclosure.

As described above, since the inner housing 22 is formed in a substantially circular tube shape, and the outer housing 23 is formed in a substantially rectangular tube shape, as illustrated in FIG. 8, centers of four surfaces forming the outer housing 23 are each spaced apart from the inner housing 22 by a first gap G1, corners of the outer housing 23 are each spaced apart from the inner housing 22 by a second gap G2, which is greater than the first gap G1.

Accordingly, since cold air transmitted to the filter 21 in the water purifying filter 20 is reduced by the insulation space formed between the inner housing 22 and the outer housing 23, occurrence of freezing the filter 21 due to the cold air can be reduced.

In addition, even when any one of the inner housing 22 and the outer housing 23 is damaged due to an external impact and the like, water leaking from the water purifying filter 20 to the outside can be prevented.

In particular, when the outer housing 23 is formed in a rectangular tube shape as described above, and the water purifying filter 20 falls down and collides with the ground surface due to a user's mistake, there is a high possibility of the corners of the outer housing 23 colliding with the ground surface. Since the corners of the outer housing 23 are each spaced a part from the inner housing 22 by the relatively big second gap G2, impact transmitted to the inner housing 22 and damage of the inner housing 22 caused thereby can be reduced due to the shape of the outer housing 23. In addition, as described above, since the water purifying filter 20 is formed as a dual structure including the inner housing 22 and the outer housing 23, the water purifying filter 20 may have excellent pressure resistance due to the inner housing 22, and the outer housing 23 may also be formed in any shape. That is, the outer housing 23 may be formed in a polygonal tube shape other than the above described rectangular tube shape and may also be formed in an oval tube shape or a combinational tube shape of flat and curved surfaces.

The outer housing 23 may include a body 23a configured to accommodate the inner housing 22, a stopper 23b provided at one side of the body 23a and configured to cover the installation hole 10b-1, and a handle 23c provided on the stopper 23b so that a user may grip the water purifying filter 20 and apply a force thereto. In the embodiment, the body 23a and the stopper 23b are each formed in a substantially rectangular shape to correspond to the installation hole 10b-1. The body 23a, the stopper 23b, and the handle 23c which form the outer housing 23 are integrally formed when the outer housing 23 is injection molded.

In addition, the water purifying filter 20 may include a support rib 23e configured to provide support between the spaced inner housing 22 and the outer housing 23 to maintain a state in which the outer housing 23 is spaced apart from the inner housing 22.

In the embodiment, the support rib 23e protrudes from an inner surface of the outer housing 23 and is supported by an outer surface of the inner housing 22.

The support rib 23e protrudes from an inner surface of the other side of the outer housing 23, which is a side opposite the open one side of the outer housing 23, and is supported by an outer surface of the other side of the inner housing 22 which is a side opposite the open one side of the inner housing 22. As described above, since the handle 23c is provided at the other side of the outer housing 23, the support rib 23e protrudes from a rear surface of the handle 23c and supports the outer surface of the other side of the inner housing 22.

The support rib 23e protrudes from the inner surface of the other side of the outer housing 23 and supports the inner surface of the other side of the inner housing 22, but is not limited thereto. Although not illustrated in the drawings, the support rib 23e may also protrude from the outer surface of the other side of the inner housing and be supported by the inner surface of the other side of the outer housing.

Figure 17:
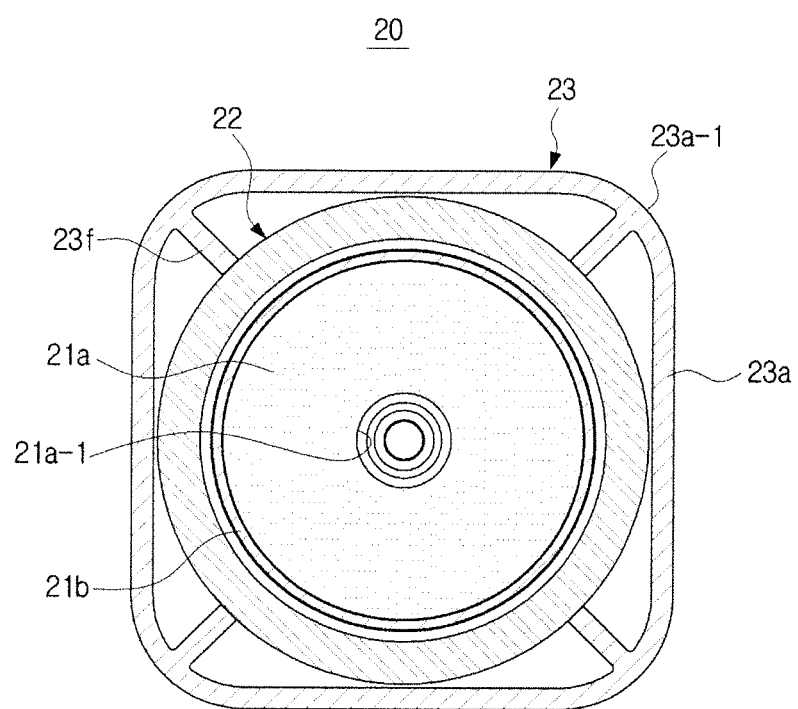
FIG. 17 is a cross-sectional view of a water purifying filter according to another embodiment of the disclosure.

In addition, as illustrated in FIG. 17, a support rib 23f may also protrude from the inner surface of the outer housing 23 and support an outer circumferential surface of the inner housing 22, and although not illustrated in the drawings, the support rib may also protrude from the outer circumferential surface of the inner housing and be supported by the inner surface of the outer housing.

However, the support ribs 23e and 23f are not essential, and the support rib 23e may also be omitted.

The handle 23c is integrally formed with the body 23a, but is shown as an example, and the handle 23c is not limited thereto. That is, the handle and the outer housing may be individually manufactured, then the handle may be fixed to the outer housing, and thus the handle may also be formed on the outer housing.

Since the installation hole 10b-1 is formed in a rectangular shape and the body 23a and the stopper 23b are each formed in a rectangular shape as described above, a user cannot rotate the water purifying filter 20 while the body 23a of the outer housing 23 passes through the installation hole 10b-1.

However, as described above, since the water purifying filter 20 is rotated to be coupled to the connection valve 12, a rotary guide 23d is provided in a cylindrical shape between the body 23a and the stopper 23b so that the water purifying filter 20 may be rotated.

Accordingly, when the water purifying filter 20 is inserted into the installation hole 10b-1, and the rotary guide 23d of the outer housing 23 is located in the installation hole 10b-1, a user may rotate the water purifying filter 20 by applying a force thereto using the handle 23c.

The connecting cap 24 is connected to the connection valve 12 to guide water introduced through the connection valve 12 to the filter 21. The connecting cap 24 may include a cap 24a configured to cover open one sides of the inner housing 22 and the outer housing 23, an inner fixer 24b configured to extend from the cap 24a toward the open one side of the inner housing 22 and configured to fix the open one side of the inner housing 22, and an outer fixer 24c configured to extend from the cap 24a toward the open one side of the outer housing 23 and configured to fix the open one side of the outer housing 23. The inner fixer 24b is spaced inwardly apart from the outer fixer 24c, the inner fixer 24b has a circular tube shape to correspond to the inner housing 22, and the outer fixer 24c has a rectangular tube shape to correspond to the outer housing 23.

Since the inner housing 22 and the inner fixer 24b are each formed in a circular tube shape, the inner housing 22 and the inner fixer 24b are fixed to each other using spin fusion which is performed by frictional heat generated by rotating any one of the inner housing 22 and the connecting cap 24 in a state in which the open one side of the inner housing 22 is in contact with the inner fixer 24b. In addition, the outer housing 23 in a rectangular tube shape is fixed by the outer fixer 24c configured to extend in a rectangular tube using one of various welding methods such as a spot welding.

However, the above-described method of fixing the inner housing 22 and the outer housing 23 to the connecting cap 24 is shown as one example, and is not limited thereto.

The water purifying filter 20 is coupled to the connection valve 12 by the connecting cap 24. The connecting cap 24 may include a connector 24d configured to extend from a center of the cap 24a, is coupled to the connection valve 12, and receives water from the connection valve 12, and a coupling hook 24e configured to integrally protrude from a portion adjacent to the connector 24d so that the water purifying filter 20 may be coupled to the connection valve 12, for connecting with the connection valve 12. In the embodiment, two coupling hooks 24e are disposed to be spaced apart from each other in a circumferential direction.

Sealing members 26 in an O-ring shape is installed on an outer side of the connector 24d for preventing water leak in a state in which the connector 24d is coupled to the connection valve 12.

Meanwhile, the connection valve 12 is formed in a cylindrical shape having open one side so that the connector 24d may be accommodated in the connection valve 12, and may include a coupling jaw 12a which is formed on an inner circumferential surface of the connector 24d and in which the above-described coupling hooks 24e rotate to be coupled thereto. In the embodiment, the connection valve 12 may include two coupling jaws 12a disposed to be spaced apart from each other in a circumferential direction to correspond to the two coupling hooks 24e provided in the water purifying filter 20.

In the embodiment, the coupling jaw 12a is formed to extend a predetermined distance in a circumferential direction and obliquely extends in the circumferential direction. Accordingly, when the water purifying filter 20 is rotated, the coupling hook 24e moves along the coupling jaw 12a and the water purifying filter 20 moves in an entrance direction of entering thereof. The connection valve 12 is connected to a water supply pipe 13 configured to supply water to be purified to the connection valve 12, and a water drain pipe 14 configured to send water purified by passing through the filter 21 of the water purifying filter 20 to the dispenser (not shown) or the ice maker (not shown).

As described above, in a state in which the connecting cap 24 and the connection valve 12 are coupled, water flows into the water purifying filter 20 through a space between an outer surface of the discharging guide 21c-4 and an inner surface of the connector 24d. The water continuously passes through the inlet guide 21c-3 and flows into a space between the inner housing 22 and the filter 21. The water flows to the adsorber 21a through a space between one end of the filter housing 21b and the first cover 21c-1, and a space between the other end of the filter housing 21b and the second cover 21d-1, and passes through the adsorber 21a by water pressure. Since foreign materials included in the water are adsorbed onto the adsorber 21a while passing through the adsorber 21a, the water is purified. The water, of which the foreign materials are completely adsorbed onto the adsorber 21a, sequentially passes through the discharging guide hole 21a-1, the first support 21c-2, and the discharging guide 21c-4, and is sent to the connection valve 12.'

In addition, the main body 10 may include an installation guide device 30 provided in the installation hole 10b-1 and configured to guide the water purifying filter 20 inserted through the installation hole 10b-1 to be stably coupled to the connection valve 12.

The installation guide device 30 serves to accurately connect the water purifying filter 20 to the connection valve 12. In addition, the installation guide device 30 serves to couple a standard water purifying filter 20 to the connection valve 12 and also servers not to couple a non-standard water purifying filter to the connection valve 12.

The installation guide device 30 may include a pressure lever 31 configured to press downward the water purifying filter 20 inserted through the installation hole 10b-1 and a guide member 32 configured to support the water purifying filter 20. The pressure lever 31 is disposed above the water purifying filter 20 that has entered the installation hole 10b-1 and presses downward the water purifying filter 20 so that the water purifying filter 20 may move while supported by the guide member 32.

In the embodiment, one end of the pressure lever 31 is fixedly installed in the main body 10, and the other end is formed as a leaf spring installed to protrude toward an entering path of the water purifying filter 20. To this end, the pressure lever 31 may include a fixer 31a fixed in the main body 10, a pressure part 31b configured to protrude toward the entering path of the water purifying filter 20 that has entered the installation hole 10b-1 and configured to apply a downward force to the water purifying filter 20, and an elastic part 31c provided between the fixer 31a and the pressure part 31b and configured to exert an elastic force.

The pressure part 31b is obliquely disposed on the entering path of the water purifying filter 20, is gradually moved upward by moving of the water purifying filter 20, and is formed in a substantially U shape to correspond to an upper portion of the water purifying filter 20.

The elastic part 31c is formed as the leaf spring which is bent to exert the elastic force.

The guide member 32 may include a guide surface 32a configured to support an outer side of the water purifying filter 20 that has entered the installation hole 10b-1, that is a lower side of the outer housing 23. The guide surface 32a is formed in an arc shape to guide rotation of the water purifying filter 20, and since the outer housing 23 is formed in the rectangular shape as described above, the guide surface 32a has a radius of curvature corresponding to a half of a diagonal length of the outer housing 23. Accordingly, the water purifying filter 20 may enter the installation hole 10b-1 and rotate in a state in which the corners of the outer housing 23 are supported by the guide surface 32a.

Meanwhile, four corners formed between four surfaces of the outer housing 23 are each formed as a rounding portion 23a-1 having a curved surface as illustrated in FIG. 8. Accordingly, when the water purifying filter 20 is rotated, since the water purifying filter 20 is rotated using the rounding portion 23a-1 having the curved surface while supported by the guide surface 32a having a curved surface, the water purifying filter 20 may be rotated easily.

In addition, in the embodiment, two guide members 32 are provided, and two guide members 32 are laterally spaced apart from each other. This is for allowing a front end of a non-standard water purifying filter to fall downward through a space between the two guide members 32 when the non-standard water purifying filter, which is smaller than a standard size, is installed through the installation hole 10b-1. That is, in a case of a water purifying filter which is smaller than a standard size, since the water purifying filter cannot be supported by the guide surface 32a, a front end of the non-standard water purifying filter is pushed downward by the pressure lever 31 and falls downward through the space between the two guide members 32.

In addition, a locking member 33 configured to prevent a non-standard water purifying filter 20 from moving toward the connection valve 12 is provided between the two guide members 32. In the embodiment, the locking member 33 may include a locking jaw 33a configured to protrude from an upper surface of the locking member 33, and the front end of a non-standard water purifying filter that has entered the installation hole 10b-1 and moved downward by the pressure lever 31 is locked by the locking jaw 33a.

In the embodiment, the installation guide device 30 may include the pressure lever 31, the guide member 32, and the locking member 33, but this is shown as one example, and the installation guide device 30 is not limited thereto. That is, even when the installation guide device 30 may include only the guide member 32, since a non-standard water purifying filter falls downward due to the weight thereof, and may not be coupled to the connection valve 12, the pressure lever 31 and the locking member 33 may be omitted.

Hereinafter, an operation of installing the above-described water purifying filter 20 in the installation hole 10b-1 of the main body 10 will be described in more detail.

Figure 12:
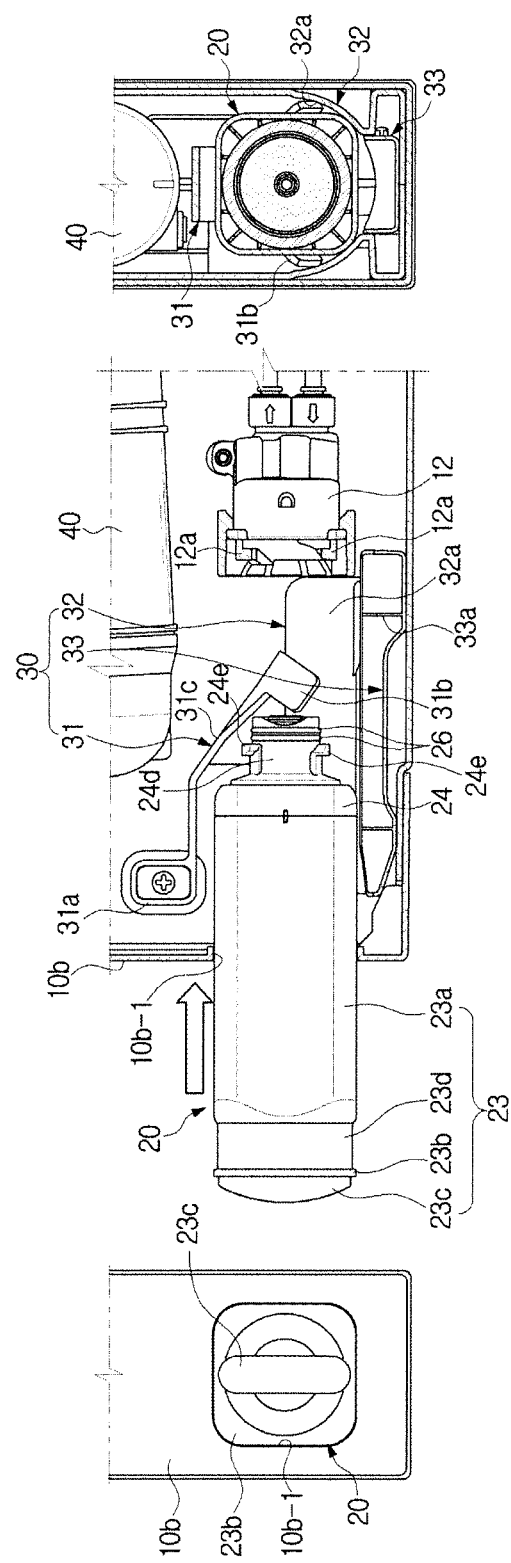
FIGS. 12 to 14 are cross-sectional views illustrating a process in which the water purifying filter according to the embodiment of the disclosure is installed in the installation guide device of the refrigerator.

First, when the water purifying filter 20 is inserted into the installation hole 10b-1 as illustrated in FIG. 12, since the outer housing 23 of the water purifying filter 20 is formed in a rectangular box shape, the water purifying filter 20 enters the installation hole 10b-1 along the installation hole 10b-1 formed in the rectangular shape. Here, since the corners of the outer housing 23 that has entered the installation hole 10b-1 are supported by the guide surface 32a, the water purifying filter 20 moves straight toward and enters the connection valve 12.

When the water purifying filter 20 moves a predetermined distance or more into the installation hole 10b-1, the front end of the water purifying filter 20 comes into contact with the pressure part 31b of the pressure lever 31 configured to protrude toward the entering path of the water purifying filter 20. When the water purifying filter 20 continuously moves toward the connection valve 12, the pressure part 31b moves upward while the elastic part 31c is elastically changed, and a downward force is applied to the water purifying filter 20 by an elastic restoring force of the elastic part 31c.

However, as described above, since the corners of the outer housing 23 in the water purifying filter 20 are supported by the guide surface 32a, a force transmitted through the pressure part 31b of the pressure lever 31 serves to maintain a state in which the corners of the outer housing 23 (that is, the rounding portions 23a-1) are supported by the guide surface 32a. Accordingly, the front end of the water purifying filter 20 does not move downward but directly moves straight toward the connection valve 12.

Figure 13:
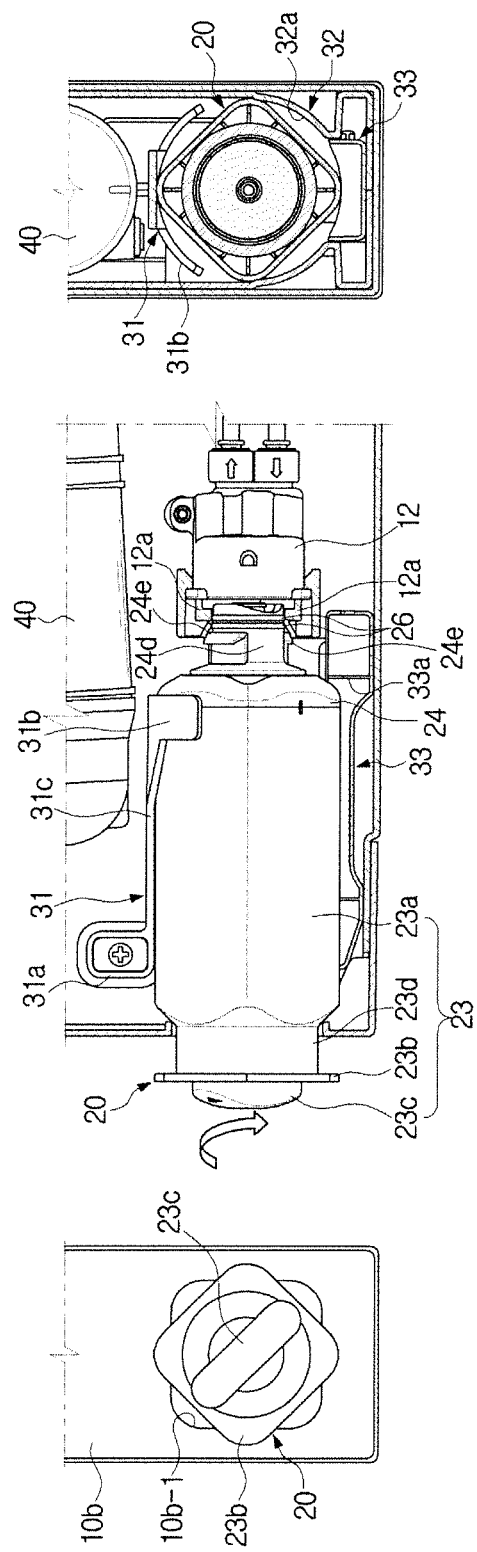
Figure 14:
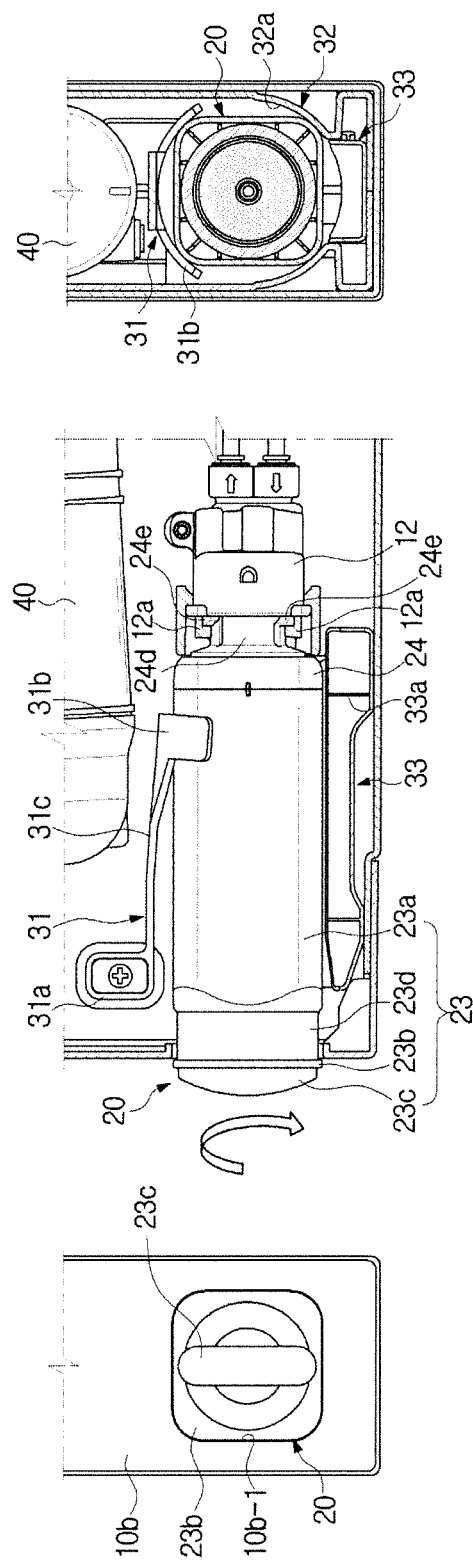

When the front end of the water purifying filter 20, that is the connector 24d, arrives at the connection valve 12 as illustrated in FIG. 13, the rotary guide 23d of the outer housing 23 is positioned at a position corresponding to the installation hole 10b-1. In such a state, since the water purifying filter 20 is rotatable, when a user rotates the water purifying filter 20 using the handle 23c, the water purifying filter 20 is rotated as illustrated in FIG. 14, and the coupling hook 24e of the connecting cap 24 is coupled to the coupling jaw 12a of the connection valve 12, and thus the water purifying filter 20 is coupled to the connection valve 12. In addition, the water purifying filter 20 simultaneously moves toward an inside of the installation hole 10b-1 and the stopper 23b of the outer housing 23 closes the installation hole 10b-1, and thus the water purifying filter 20 is completely installed.

Figure 15:
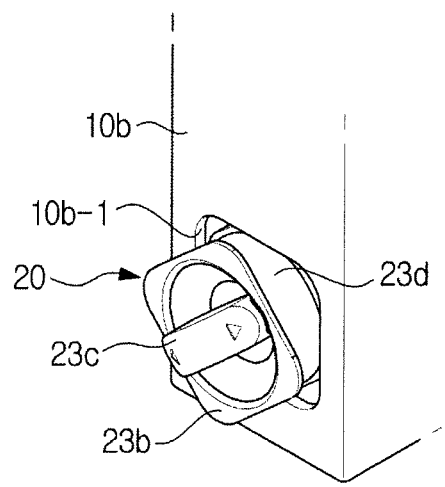
FIG. 15 is a perspective view illustrating a position of a stopper before the water purifying filter according to the embodiment of the disclosure is rotated.

In addition, as illustrated in FIG. 15, before the water purifying filter 20 rotates, the stopper 23b protrudes forward from the installation hole 10b-1, or a position of the stopper 23b is misaligned with the installation hole 10b-1 in a circumferential direction.

Figure 16:
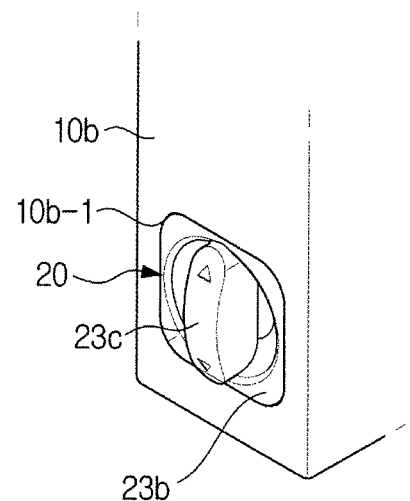
FIG. 16 is a perspective view illustrating a position of a stopper after the water purifying filter according to the embodiment of the disclosure is rotated.

On the other hand, when the water purifying filter 20 is rotated and the connecting cap 24 is coupled to the connection valve 12, as illustrated in FIG. 16, not only the stopper 23b closes the installation hole 10b-1, but also positions of the installation hole 10b-1 and the stopper 23b are the same.

Accordingly, a user may determine whether the connecting cap 24 of the water purifying filter 20 is coupled to connection valve 12 using the position of the stopper 23b.

Next, although not illustrated in the drawings, a case in which a non-standard water purifying filter is installed in a refrigerator will be described.

When a water purifying filter which is bigger than a standard size is inserted into the installation hole 10b-1, the water purifying filter which is bigger than the standard size cannot pass through the installation hole 10b-1 formed in a rectangular shape.

In addition, a water purifying filter having a size which is smaller than that of the installation hole 10b-1 may pass through the installation hole 10b-1 but moves toward the connection valve 12 while not supported by the guide surface 32a.

When the water purifying filter which is smaller than the standard size moves a predetermined distance or more into the installation hole 10b-1, a downward force is applied to a front end of the water purifying filter which is smaller than the standard size by the pressure part 31b of the pressure lever 31 configured to protrude toward the entering path thereof. As described above, in the case of the water purifying filter which is smaller than the installation hole 10b-1, since the water purifying filter is not supported by the guide surface 32a unlike the standard water purifying filter 20, the front end of the water purifying filter which is smaller than the standard size does not overcome an elastic restoring force of the elastic part 31c and is obliquely moved downward by the pressure lever 31. As described above, since the locking member 33 is disposed between two guide members 32, the front end of the non-standard water purifying filter is locked by the locking jaw 33a of the locking member 33.

Accordingly, since a water purifying filter which is bigger than a standard size cannot pass through the installation hole 11a formed in a rectangular shape, and a front end of a water purifying filter which is small enough to pass through the installation hole 11a is locked by the locking jaw 33a of the locking member 33, a non-standard water purifying filter does not arrive at the connection valve 12, and thus coupling with the connection valve 12 is prevented.

In the embodiment, although the outer housing 23 is formed in a rectangular tube shape, this is for preventing a non-standard water purifying filter from being coupled to the connection valve 12 by the installation guide device 30, but the outer housing 23 may also be formed in a circular tube shape like the inner housing 22 to increase insulation performance of the water purifying filter 20. In this case, a radius of curvature of an outer circumferential surface of the outer housing 23 may be the same as that of the guide surface 32a of the guide member 32 so that the water purifying filter 20 may move straight along a surface of the guide member 32 and be coupled to the connection valve 12.

In the embodiment, the pressure lever 31 is formed to include the elastic part 31c formed as a leaf spring, but is not limited thereto, and one end of the pressure lever may be rotatably installed in the refrigerator, and the pressure lever may be elastically supported by a separate elastic member such a torsion spring.

The water purifying filter 20 is installed in the installation hole 10b-1 provided in the partition 10b. A water tank 40 configured to store purified water is disposed in the partition 10b together with the water purifying filter 20 and the installation guide device 30.

In the embodiment, the water purifying filter 20, the installation guide device 30, and the water tank 40 are installed in the partition, but this is shown as one example, and the water purifying filter 20, the installation guide device 30, and the water tank 40 may be installed at various locations in the storage compartment 10a such as a sidewall of the main body 10 and the partition which divides a refrigerator compartment and a freezer compartment.

In addition, the water purifying filter 20, the installation guide device 30, and the water tank 40 may be installed at various locations, such as the door 11 as well as a rear surface or lower portion of the main body 10 in addition to the storage compartment 10a, according to design.

In addition, in the embodiment, all of the water purifying filter 20, the installation guide device 30, and the water tank 40 are installed together in the partition 11b, but the embodiment is not limited thereto. Although both of the water purifying filter 20 and the installation guide device 30 have to be installed together, the water tank 40 may be installed at a separate location. That is, even though the water purifying filter 20 and the installation guide device 30 are installed in the partition, an installation location of the water tank 40 may be variously changed, for example, the water tank 40 is installed in the door 11 in which the dispenser or the ice maker is positioned.

In the embodiment, the insulation space formed between the inner housing 22 and the outer housing 23 is filled with air, but is not limited thereto, and a vacuum state of the insulation space may be maintained so that heat transfer due to thermal conduction may not occur to improve insulation performance, or the insulation space may be filled with an insulation member, such as a foam resin having excellent insulation performance, to improve the insulation performance of the insulation space.

In the embodiment, the guide member 32 may include a pair of guide members 32 spaced apart from each other, and this is for serving all functions of the guide members 32 configured to guide the water purifying filter 20 to the connection valve 12 and to prevent a water purifying filter which is smaller than a standard size from being connected to the connection valve 12.

Accordingly, only one guide member 32 may also be disposed in the installation hole 10b-1 so that the guide member 32 may serve to only guide the water purifying filter 20 to the connection valve 12.

As is apparent from the above description, in a water purifying filter according to the disclosure, since an insulation space is formed between an inner housing and an outer housing, freezing of a filter can be reduced.

In addition, in a water purifying filter according to the disclosure, since water leaking does not occur even when one of an inner housing and an outer housing is broken by an external impact, the water leaking from the water purifying filter can be reduced.

In addition, since a water purifying filter according to the disclosure may include an inner housing and an outer housing, the water purifying filter can have high pressure resistance using the inner housing and can also be formed in any shape such as a rectangular tube shape using the outer housing.

In addition, in a refrigerator to which a water purifying filter according to the disclosure is applied, a standard water purifying filter can be guided and coupled to a connection valve by an installation guide apparatus, but a non-standard water purifying filter cannot be coupled to the connection valve.

While one or more embodiments of the disclosure have been illustrated and described above, the disclosure is not limited thereto, and may be variously changed or modified without departing from the scope of the disclosure. Therefore, modified or changed embodiments are included in the range of the claims of the disclosure.

What is claimed is:

1. A refrigerator comprising:
a main body having an installation hole, the installation hole having a filter entrance section with a polygonal cross section; and
a water purifying filter assembly installable in and removable from the refrigerator through the installation hole of the refrigerator, the water purifying filter assembly comprising:
an outer housing having an open side; and
a connecting cap disposed to cover the open side of the outer housing, and configured to connect to a connection valve of the refrigerator by being rotated when the water purifying filter assembly is rotated,
wherein the outer housing comprises:
a body having a polygonal tube shape and a polygonal cross section corresponding to the polygonal cross section of the filter entrance section so that the outer housing fits through the filter entrance section,
an end portion disposed on an opposite side of the outer housing from the open side of the outer housing and having a polygonal cross section corresponding to the polygonal cross section of the filter entrance section, and
a rotation guide disposed between the body and the end portion and having a cylindrical cross section with a reduced diameter that is smaller than a distance between corners of the polygonal cross section of the body and smaller than a cross section of the filter entrance section, such that when the water purifying filter assembly is partially inserted into the installation hole and the connecting cap is approaching the connection valve, the rotation guide lines up with the filter entrance section of the installation hole and the reduced diameter of the cylindrical cross section allows rotation of the water purifying filter assembly within the installation hole until the connecting cap is connected to the connection valve.

2. The refrigerator of claim 1, wherein
the connection valve is disposed inside the main body and is accessible through the installation hole, and
the main body comprises an installation guide device disposed inside the main body and configured to guide insertion and rotation of the water purifying filter assembly inserted into the main body through the installation hole to be coupled to the connection valve.

3. The refrigerator of claim 2, wherein the installation guide device further comprises a pressure lever configured to press downward on an upper side of the outer housing when the water purifying filter assembly is inserted into the main body through the installation hole.

4. The refrigerator of claim 2, wherein the installation guide device further comprises a pair of guide members configured to support a lower side of the outer housing of the water purifying filter assembly when the water purifying filter assembly is inserted into the main body through the installation hole.

5. The refrigerator of claim 4, wherein each guide member of the pair of guide members is configured to:
guide the outer housing in a direction of inserting the water purifying filter assembly when the body passes through the installation hole while the water purifying filter assembly is being inserted into the installation hole by an external force; and
guide rotation of the outer housing when the rotation guide is located in the installation hole while the water purifying filter assembly is being inserted into the installation hole by an external force.

6. The refrigerator of claim 5, wherein
the body of the outer housing is configured to accommodate an inner housing and having a polygonal cross section corresponding to the filter entrance section, and
the rotation guide has the cylindrical cross section such that the water purifying filter assembly is rotatable when the rotation guide, rather than the body or the end portion with polygonal cross sections, is located in the installation hole while the water purifying filter assembly is being inserted through the installation hole.

7. The refrigerator of claim 4, wherein the pair of guide members are spaced apart from each other in a direction perpendicular to a direction of inserting the water purifying filter assembly.

8. The refrigerator of claim 7, wherein each guide member of the pair of guide members comprises a respective guide surface to support a corresponding lower side corner of the outer housing of the water purifying filter assembly,
wherein each of the respective guide surfaces has an arc shape to guide rotation of the water purifying filter assembly.

9. The refrigerator of claim 8, wherein the guide surface has a radius of curvature corresponding to half of a distance between corners of the outer housing that are diagonally opposite to each other.

10. The refrigerator of claim 9, wherein the outer housing further comprises a round surface formed at each corner of the polygonal tube shaped body of the outer housing, and
wherein when the water purifying filter assembly is rotated while being inserted into the main body through the installation hole, the guide member is provided so that the round surface is rotatably supported by the guide surface.

11. The refrigerator of claim 7, wherein the installation guide device further comprises a locking member disposed between the pair of guide members and located at a lower end of the pair of guide members.

* * * * *